(12) United States Patent
Lydick

(10) Patent No.: US 10,844,846 B2
(45) Date of Patent: Nov. 24, 2020

(54) RENEWABLE ENERGY UTILIZING CLOSED CYCLE THERMODYNAMIC BASED ENGINE AND METHOD OF OPERATION

(71) Applicant: Trace Lydick, Athens, OH (US)

(72) Inventor: Trace Lydick, Athens, OH (US)

( * ) Notice: Subject to any disclaimer, the term of this patent is extended or adjusted under 35 U.S.C. 154(b) by 0 days.

(21) Appl. No.: 16/242,945

(22) Filed: Jan. 8, 2019

(65) Prior Publication Data

US 2019/0211808 A1 Jul. 11, 2019

Related U.S. Application Data

(60) Provisional application No. 62/614,989, filed on Jan. 8, 2018.

(51) Int. Cl.
*F03G 6/06* (2006.01)
*F03G 6/00* (2006.01)

(52) U.S. Cl.
CPC ............... *F03G 6/068* (2013.01); *F03G 6/00* (2013.01); *F03G 6/001* (2013.01); *F03G 6/003* (2013.01); *F03G 2006/061* (2013.01); *F03G 2006/062* (2013.01); *Y02E 10/46* (2013.01); *Y02E 10/47* (2013.01)

(58) Field of Classification Search
CPC . F03G 6/068; F03G 6/003; F03G 6/00; F03G 6/001; F03G 2006/061; F03G 2006/062; Y02E 10/46; Y02E 10/47
USPC ...................... 60/517, 641.8, 641.1, 676, 698
See application file for complete search history.

(56) References Cited

U.S. PATENT DOCUMENTS

| 5,228,293 | A | * | 7/1993 | Vitale | F02G 1/0435 60/641.14 |
|---|---|---|---|---|---|
| 5,272,879 | A | * | 12/1993 | Wiggs | F01K 25/08 60/676 |
| 6,846,208 | B1 | * | 1/2005 | Goldmeer | B63H 21/20 440/3 |
| 8,222,025 | B2 | * | 7/2012 | Wong | A01G 7/02 435/292.1 |
| 9,365,812 | B2 | * | 6/2016 | Walsh | F24S 23/12 |
| 2009/0250099 | A1 | * | 10/2009 | Pan | H01L 31/052 136/248 |
| 2015/0047355 | A1 | * | 2/2015 | Willard, Jr. | F01K 13/00 60/698 |

* cited by examiner

*Primary Examiner* — Hoang M Nguyen
(74) *Attorney, Agent, or Firm* — Andrew Morabito

(57) ABSTRACT

The present invention is a renewable energy utilization engine power plant comprising; a solar radiant energy collecting system, wherein the solar radiant heat collecting system comprises; a focusing apparatus for collecting solar radiant energy, and a light guide for guiding the solar radiant energy collected by the focusing apparatus to a heating chamber; a biomass processing system, wherein the biomass processing system generates thermal energy from the conversion of biomass material; a combustible fluid processing system, wherein the combustible fluid processing system generates thermal energy from the combustion of the combustible fluid within the heating chamber; and a closed-cycle thermodynamic based engine driven by the collection of the solar radiant energy and thermal energy, wherein the mechanical power generated by the closed-cycle thermodynamic based engine is converted to electrical energy.

18 Claims, 4 Drawing Sheets

RENEWABLE ENERGY UTILIZING CLOSED CYCLE THERMODYNAMIC BASED ENGINE AND METHOD OF OPERATION

CROSS-REFERENCE TO RELATED APPLICATIONS

This application claims the benefit of priority under 35 USC 120) of U.S. application No. 62/614,989 filed on Jan. 8, 2017. The disclosure of the prior applications is considered part of (and is incorporated by reference in) the disclosure of this application.

BACKGROUND

The present invention relates to a the closed-cycle thermodynamic based engine system, and more specially to a the closed-cycle thermodynamic based engine integrated with a variety of renewable energy sources to power the closed-cycle thermodynamic based engine with minimal environmental impact.

As the warnings and evidence of environmental damage continue to mount, costs of energy continue to increase, and the dependency on technology increases, a more stable and sound source of energy is needed. This is especially true in times of disaster, where long term shut downs of the electrical grid have put people with medical conditions in danger, have caused stores of food to go bad, brought transportation and commerce to a halt, and have in many cases taken weeks to repair. More so recently, due to perceived shortages and higher prices of fossil fuels and due to pollution concerns, the interest has increased and the pace of development of technologies that utilize alternative energy sources (such as solar) has accelerated.

Existing methods for achieving local electrical generation and on-demand power usually include traditional internal combustion generators that run on gasoline or diesel, whose costs thereof mount quickly and offer no long-term costs savings or environmental benefit.

Renewable energy sources that do not pollute, are low cost, and available virtually everywhere in the world are desired to reduce our effect on the environment. For these reasons, over the years there have been many systems and methods that attempted to utilize renewable energy and convert it into other usable forms of energy such as electricity.

One type of renewable energy is solar energy. There are several techniques to capture solar energy. One technique to harvest solar energy is through the implementation of photovoltaic cells, that directly convert the solar energy into electricity. Another technique is through the use of the heat to be collected and converted into mechanical energy.

One type of power plant to generate electricity is a heat engine, which converts energy to mechanical energy. In one embodiment, a Stirling engine utilizes heat, which is applied at one end of the engine and cooling is provided at a different location. The working fluid, which is sealed inside the engine, goes through a cycle of heating and cooling. The cycle forces a piston inside the engine to move and produce mechanical energy.

However, typically a Stirling engine is provided the heat from a non-renewable energy source. Therefore, is it desired to have a system where a renewable energy source provides clean power for the Stirling engine at a consistent and continuous rate to allow for continuous operation of the Stirling engine.

SUMMARY

The present invention is a renewable energy utilization engine power plant comprising; a solar radiant energy collecting system, wherein the solar radiant heat collecting system comprises; a focusing apparatus for collecting solar radiant energy, and a light guide for guiding the solar radiant energy collected by the focusing apparatus to a heating chamber; a biomass processing system, wherein the biomass processing system generates thermal energy from the conversion of biomass material; a combustible fluid processing system, wherein the combustible fluid processing system generates thermal energy from the combustion of the combustible fluid within the heating chamber; and a closed-cycle thermodynamic based engine driven by the collection of the solar radiant energy and thermal energy, wherein the mechanical power generated by the closed-cycle thermodynamic based engine is converted to electrical energy.

In an additional embodiment, the present invention is a method of producing electrical energy, the method comprising: collecting solar radiant energy through at least one focusing device and directing the concentrated solar radiant energy to a heating chamber of a closed-cycle thermodynamic based engine; generating heat through the conversion of biomass and directing the generated heat to the heating chamber of the closed-cycle thermodynamic based engine; combusting combustible fluids, wherein heat is produced, and directing the heat to the heating chamber of the a closed-cycle thermodynamic based engine; and using the solar radiant energy and the heat to generate mechanical energy, wherein a mechanical energy is converted into electrical energy.

Figure 1:
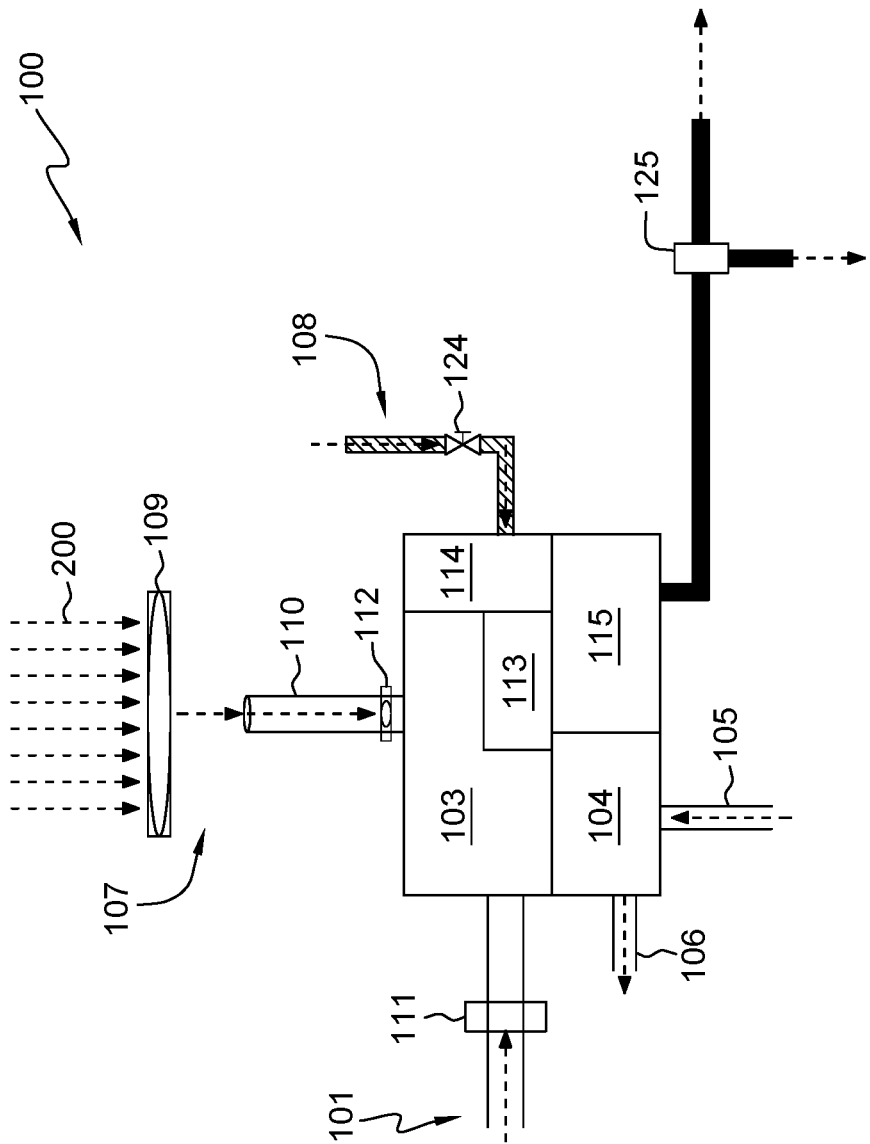
FIG. 1 depicts a schematic diagram of a power plant, in accordance with one embodiment of the present invention.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

A description will be given in detail below of several embodiments in accordance with the present invention with reference to the accompanying figures. The present invention provides a system for electrical energy generation that is created through various renewable or low environmental impact sources, designed to solve a problem concerning a global environment pollution, and the need for independent power generation. Energy is collected through renewable energy sources and is used to apply heat to a closed-cycle thermodynamic based engine (e.g. a Stirling engine) and electrical energy is generated by the closed-cycle thermodynamic based engine. A Stirling engine is used in the detailed embodiment below, but various heat engines (converting heat to mechanical energy) may be used.

This invention provides a cost effective, low environmental impact mechanical and/or electrical energy producing system. Heat energy is collected by the renewable energy systems and is used to power the closed-cycle thermodynamic based engine. Wherein the closed-cycle thermodynamic based engine produces mechanical energy which is then converted to electrical energy. In some embodiments, the system is substantially a closed system.

FIG. 1 depicts a schematic diagram of a power plant 100, in accordance with one embodiment of the present invention.

A closed-cycle thermodynamic based engine 102 is used to convert heat into mechanical energy and/or electrical energy. Various types of closed-cycle thermodynamic based engines may be employed. In one embodiment, a Stirling engine is used. The closed-cycle thermodynamic based engine 102 receives heat from at least one source, to power the engine. The closed-cycle thermodynamic based engine 102 can include a Stirling-type engine, a Rankine-type engine, or the like. A Stirling engine is a closed-cycle regenerative heat engine with a gaseous working fluid. The Stirling engine is closed-cycle because the working fluid, i.e., the gas in a heat chamber 103 which pushes on a piston, is permanently contained within the closed-cycle thermodynamic based engine 102. This also categorizes it as an external heat engine which means it can be driven by any convenient source of heat. "regenerative" refers to the use of an internal heat exchanger called a 'regenerator' which increases the engine's thermal efficiency compared to the similar but simpler hot air engine. In some embodiments, the closed-cycle thermodynamic based engine 102 has a monitoring system 113 which monitors the operation of the closed-cycle thermodynamic based engine 102, controls the operations of the closed-cycle thermodynamic based engine 102, and communicates with each energy production system to control the heat sources based on the performance and operation of the closed-cycle thermodynamic based engine 102. The monitoring system 113 assists in maintaining optimal operations of the closed-cycle thermodynamic based engine 102. In the depicted embodiment, the monitoring system 113 is integrated with the closed-cycle thermodynamic based engine 102 and communicates with the various controllers and electrical components of the system via network.

The network may be a local area network (LAN), a wide area network (WAN) such as the Internet, any combination thereof, or any combination of connections and protocols that can support communications between the monitoring system 113 and the other electrical components of the system, in accordance with embodiments of the invention. The network may include wired, wireless, or fiber optic connections. The network can include links using technologies such as Ethernet, 802.11, worldwide interoperability for microwave access (WiMAX), 3G, 4G, 5G, CDMA, GSM, LTE, digital subscriber line (DSL), etc. Similarly, the networking protocols used on the network can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In the depicted embodiment, the closed-cycle thermodynamic based engine 102 has a cooling system 104. The cooling system 104 has an inlet 105 and an outlet 106. In some embodiments the cooling system using liquid cooling to remove excess thermal energy, with the common heat transfer fluids. The advantages of water cooling over air cooling include water's higher specific thermal energy capacity and thermal conductivity. The liquid coolant being circulated by a coolant pump through a duct to the heating chamber 103 and a duct away from the heating chamber 103. In some embodiments, the outlet 106 sends the heated water into the building or home to provide hot water, if water is used in the cooling system 104. In additional embodiments, various systems or components are used to cool the liquid such as radiators, fans, or the like.

In the depicted embodiment, the closed-cycle thermodynamic based engine 102 receives heat from a variety of sources. The general purpose for the present invention is to provide a system that is able to produce electrical energy from a closed-cycle thermodynamic based engine 102 through at least one renewable and low environmental impact heat sources. In the depicted embodiment, one heat source is a biomass conversion system 101, another heat source is a solar energy conversion system 107, and another is a combustible fluid system 108.

The closed-cycle thermodynamic based engine 102 receives the necessary and required heat to operate at a high level of efficiency and ideally continuously as the heat sources are implemented at ideal times. Through the various heat sources, it is intended that at least one of the heat sources is able to be operational at all times.

The solar energy conversion system 107 is used to concentrate solar radiant energy 200 through at least one focusing device 109. The focusing device 109 is used to concentrate and direct the solar radiant energy 200 prior to entering the light guide 110. The focusing device 109 may be, but not limited to, a convex magnifying lens, a parabolic mirror, a Fresnel lens, or the like known to one at least ordinary skill in the art, wherein the focusing device 109 concentrates and directs the solar radiant energy. In some embodiments, multiple focusing devices 109 may be used to further concentrate or direct the solar radiant energy 200. In some embodiments, the focusing device 109 or the solar energy conversion system 107 may have actuators and motors to adjust the angle and position of the focusing device 109 based on the movement of the sun throughout the day.

A light guide 110 is used in connection with the focusing device 109 to direct the solar radiant energy 200 into the heating chamber 103 of the closed-cycle thermodynamic based engine 102. The light guide 110 may be, but not limited to, a series of reflect surfaces, flexible fibers (e.g. fiber optics) which are able to transmit solar radiant energy 200, or the like know by a person of at least ordinary skill in the art. The solar radiant energy 200 is used to heat the working fluid of the closed-cycle thermodynamic based engine 102. As the solar radiant energy 200 is directed through the light guide 110, a control device 112 measures various properties of the received solar radiant energy 200. In some embodiments, the light guide 110 may have various actuators or motors to adjust the angle and position of the various elements of the light guide 110 to redirect the solar radiant energy 200 based on adjustment of the focusing device 109. The control device 112 may adjust the angle or positioning of the focusing device 109 or the light guide 110 to increase or decrease the heat which is applied to the heating chamber 103 of the closed-cycle thermodynamic based engine 102. If the control device 112 determines that the solar radiant energy is in excess of the closed-cycle thermodynamic based engine 102 requirements, the control device 112 is able to adjust the light guide 110 or the focusing device 109. In some embodiments, additional focusing devices 109 are located at the end of the light guide 110 distal to the heating chamber 103 to further concentrate or dissipate the radiant solar energy 200. The control device 112 may be or include various sensors, actuators, or monitoring devices which would be known to one skilled in the art.

The biomass conversion system 101 receives heat energy from a variety of biomass conversion processes. This can be, but not limited to, clean burning furnaces and the like to produce heat from a renewable energy source. For example, wood and agricultural products, solid waste, landfill gases, and alcohol fuels are sources for the biomass conversion system 101. The heat that is generated from the biomass conversion system 101 is directed to the heating chamber 103 of the closed-cycle thermodynamic based engine 102 to assist in heating the working fluid of the closed-cycle thermodynamic based engine 102. As the heat passes through the biomass conversion system 101, a control device 111 monitors the transfer of heat generated by the biomass conversion system 101 and is able to adjust or redirect the heat based on the closed-cycle thermodynamic based engine 102 needs in relation to the other heat generation systems. In some embodiments, where the solar energy conversion system 107 and the biomass conversion system 101 both provide portions of the heat energy required to power the closed-cycle thermodynamic based engine 102. In some embodiments the control device 111 may be or include various sensors, actuators, or monitoring devices which would be known to one skilled in the art.

In some embodiments, the control unit 103 prioritizes the solar energy conversion system 107 over the biomass conversion system 101. The prioritization of the various heat sources is based on the environmental impact and cost of energy production, with solar having the lowest impact of the various heat sources.

The monitoring system 113 provides the communication between the heat generation systems and the closed-cycle thermodynamic based engine 102. The monitoring system 113 assists in maintaining a proper and substantially continuous heat source for the closed-cycle thermodynamic based engine 102 to maintain optimal operations. Through the monitoring system 113 collecting data from the energy systems, processing the data, and activating or deactivating the various energy systems. The monitoring system 113 is also able to adjust the various components of the energy systems when necessary to maintain the optimal operation conditions for the closed-cycle thermodynamic based engine 102.

The monitoring system 113 also provides the proper protocols for the mechanical or electrical energy created by the closed-cycle thermodynamic based engine 102. This may include directing the electrical energy to various batteries, devices, systems, or if excess energy is generated, supplying the energy back to various public municipalities and private companies which produce and provide electricity.

The monitoring system 113 communications with the controllers though the means of any appropriate communication network protocol, many of which are known in the art. A specific program for carrying out the functions of the monitoring system 113 may be accomplished by standard skill in the art using conventional information processing languages.

The combustion energy system 108 provides thermal energy from combustion of a combustible gas or fluid, which is supplied to the combustion energy system 108. The combustible gas or fluid is provided to a combustion chamber 114, which is used to ignite the combustible gas or fluid for the purpose of generating thermal energy. In the depicted embodiment, a combustion chamber 114 is integrated into the closed-cycle thermodynamic based engine 102. In additional embodiments, the combustion chamber 114 is an independent component of the combustion energy system 108. The combustion chamber 114 provides a secure chamber for the combustion of the various gases, to generate heat which is then used to heat the working fluid of the closed-cycle thermodynamic based engine 102. In some embodiments, the gas used is natural gas, propane, hydrogen, or other fluid hydrocarbons (depicted in FIGS. 2 and 3). In additional embodiments, various safety mechanisms and systems may be incorporated into the combustion energy system 108 to provide safe operation and adequate shut-off mechanisms. For example, various shut off valves and sensors are incorporated into the combustion energy system 108.

In the depicted embodiment, a valve mechanism 124 is integrated into the combustion energy system 108. The valve mechanism 124 is used to control the flow of the combustible gas or fluid 125 into the combustion chamber 114. In some embodiments, the valve mechanism 124 is electrically controlled and is in communication with the monitoring system 113.

The closed-cycle thermodynamic based engine 102 converts the heat energy into mechanical energy, which is used to power a generator which converts the mechanical energy into electricity. In some embodiments, the closed-cycle thermodynamic based engine 102 and the generator are a unitary element. In additional embodiments, the closed-cycle thermodynamic based engine 102 and the generator are individual components of the system. This electricity is then is stored in a storage device, or used to power various devices, equipment, or components which require electrical energy.

A conversion component 115 converts the mechanical energy created by the closed-cycle thermodynamic based engine 102 into the electrical energy. In the depicted embodiment, the conversion component 115 is integrated into the closed-cycle thermodynamic based engine 102. In additional embodiments, the conversion component 115 may be an independent element of the overall system. In the depicted embodiment, a converter 125 provides for the ability to convert or invert the electrical energy created by the conversion component 115. Based on the desired and/or required current (alternating current (AC) or direct current (DC)) for the output, the converter 125 is able to convert or invert the current received to the desired output.

In the depicted embodiment, the electricity is split between two final destinations. For example, one destination may be house or structure which used the electricity to power various electrical devices. The other destinations may be a municipality or private company which is able to repurpose the excess electricity generated by the present system.

Figure 2:
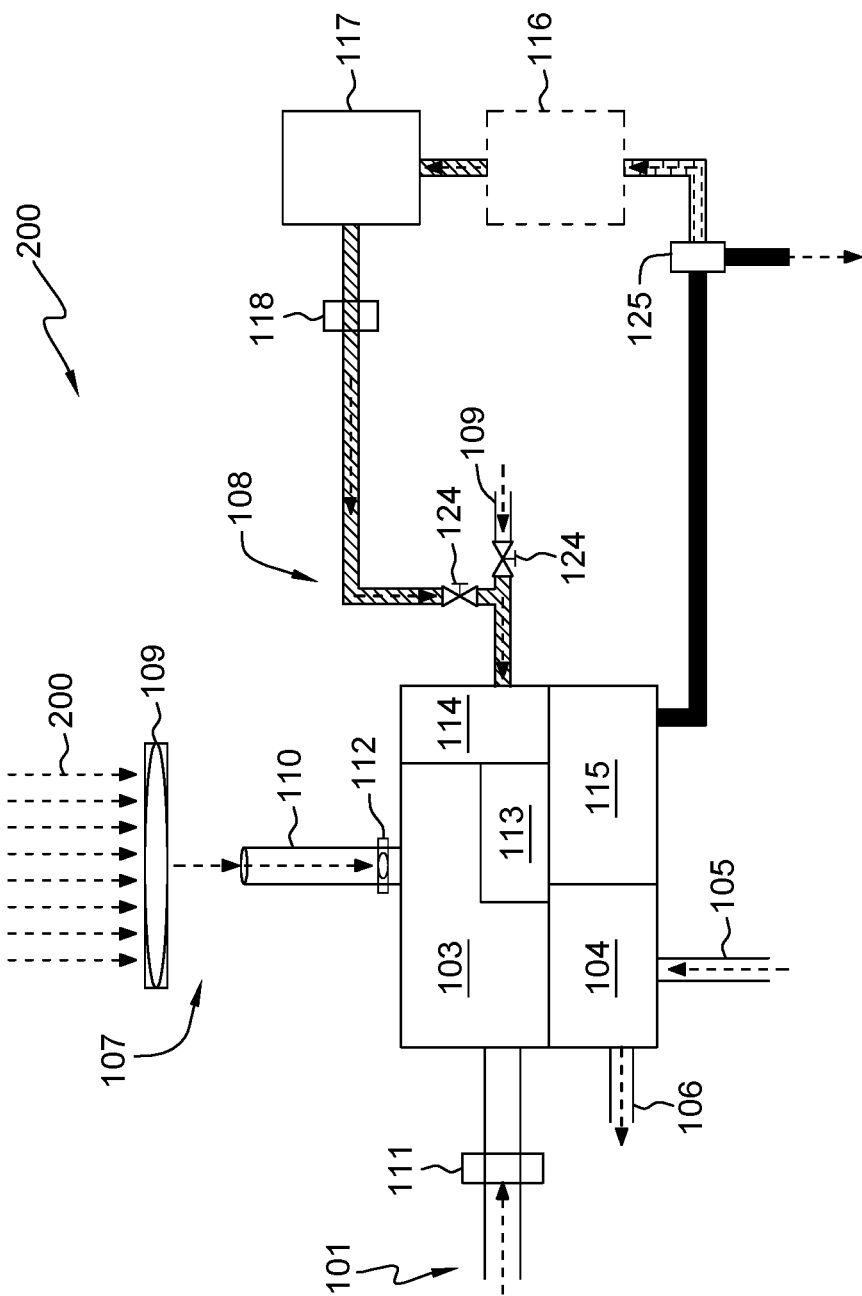
FIG. 2 depicts a schematic diagram of the power plant, in accordance with another embodiment of the present invention.

FIG. 2 depicts a schematic diagram of the power plant 200, in accordance with one embodiment of the present invention. In the depicted embodiment, depicts an additional system integrated into the combustion energy system 100, wherein hydrogen is produced internally to provide a combustible gas for the combustion energy system 108.

In the depicted embodiment, a portion of the electricity generated by the closed-cycle thermodynamic based engine 102 is used to power an electrolysis processing system 116. In one embodiment, the electrolysis processing system performs the decomposition of water (which is supplied to the electrolysis processing system 116) into oxygen and hydrogen. The hydrogen is transferred to a storage container 117. The storage container 117 may be, but not limited to a metal hydride storage system, compressed gaseous storage system, liquid hydrogen storage systems, or various chemical storage systems.

A controller 118 is used to communicate with the monitoring system 113 to determine if hydrogen is required to provide additional thermal energy for the closed-cycle thermodynamic based engine 102. If it is determined that the hydrogen gas is required, the controller 118 processes the desired quantity or flow rate of hydrogen gas to the combustion chamber 114. In some embodiments the controller 118 may be or include various sensors, actuators, or monitoring devices which would be known to one skilled in the art.

In the depicted embodiment, a secondary fuel supply 119 is integrated into the combustible fluid system 108. The secondary fuel supply 119 may be natural gas, propane, or other fluid hydrocarbons which are easily accessible at most homes and locations to provide a fourth source of thermal energy for the closed-cycle thermodynamic based engine 102. The secondary fuel supply 119 is controlled by the valve mechanism 124 which is able to adjust the flow of the secondary combustible gas or fluid to the combustion chamber 114.

Figure 3:
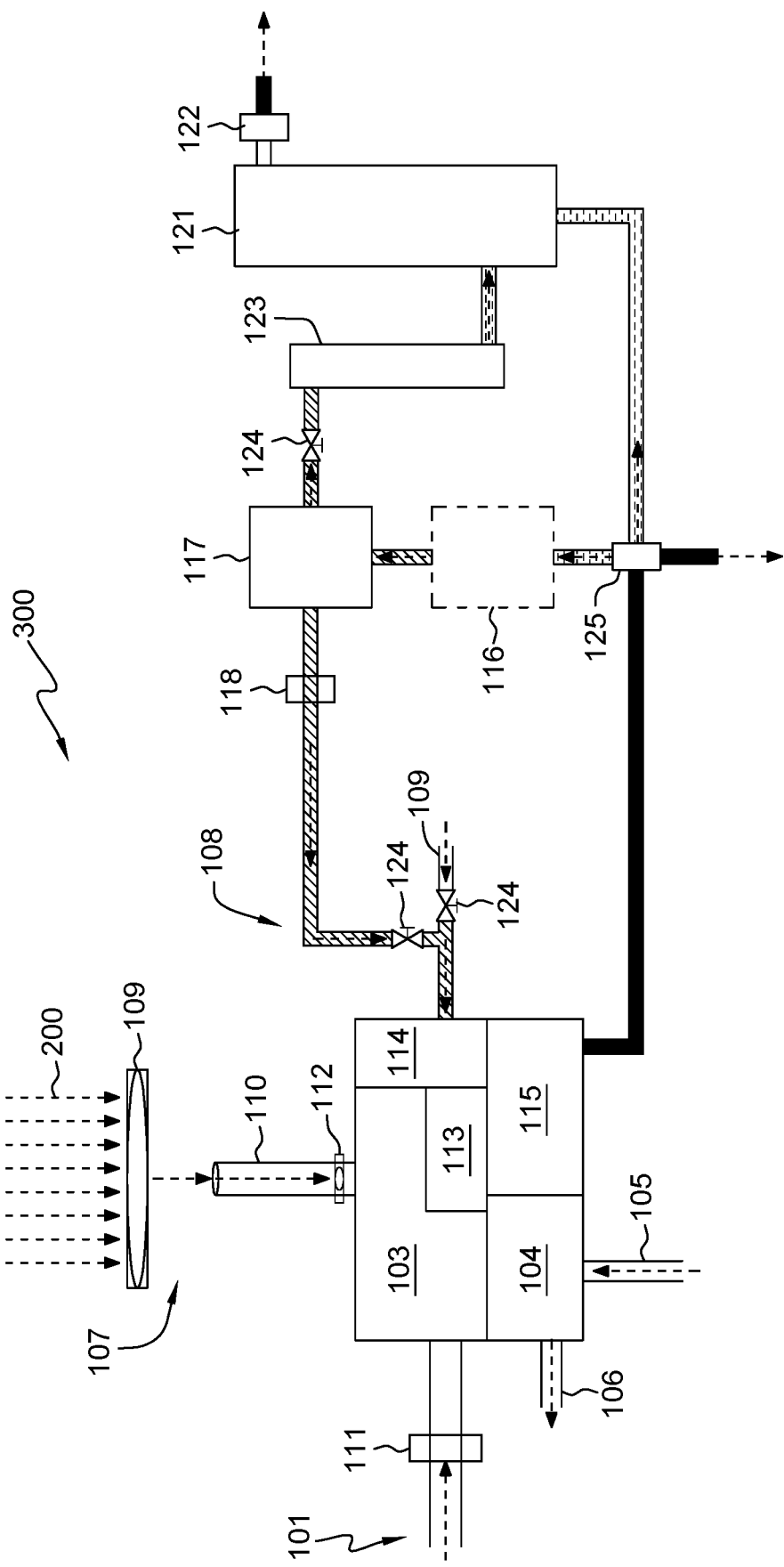
FIG. 3 depicts a schematic diagram of the power plant, in accordance with another embodiment of the present invention.

FIG. 3 depicts a schematic diagram of the power plant 300, in accordance with one embodiment of the present invention. In the depicted embodiment, depicts an additional system integrated into the combustion energy system 100, wherein hydrogen is produced internally to provide a combustible gas for the combustion energy system 108 through a secondary process as well as the addition of a battery assembly 121.

The battery assembly 121 is able to store a predetermined quantity of energy to provide for an additional backup system if the closed-cycle thermodynamic based engine 102 is unable to operate or meet the power demands of the electrical devices connected to the system 300. The battery assembly is directly connected to a converter 122. Based on the desired and/or required current (alternating current (AC) or direct current (DC)), the converter 122 is able to convert or invert the current received to the desired output, and to control the flow of the electricity from the battery assembly 121. The battery assembly 121 includes the various components necessary to properly charge the battery and discharge the electricity to the desired device or system. In some embodiments, the battery assembly 121 may have a plurality of cells or stacks to increase the storage ability of the battery assembly 121.

In the depicted embodiment, the battery 121 is able to receive electricity from a fuel cell 123, which is used to convert the hydrogen stored in storage 117 into electricity. For example, the fuel cell 123 may be, but not limited to a PEM (i.e., Proton Exchange Membrane) fuel cells, SPE (Solid Polymer Electrolyte) fuel cell. In some instances, the hydrogen production may exceed the quantity of gas needed for the closed-cycle thermodynamic based engine 102, the monitoring system 113 is able to provide the excess hydrogen to a fuel cell 123 which is able to convert the hydrogen into electricity which is used to further charge the battery 121. The fuel cell 123 may be a variety of fuel cells known to those skilled in the art, that incorporate an electrochemical cell to convert the hydrogen.

Figure 4:
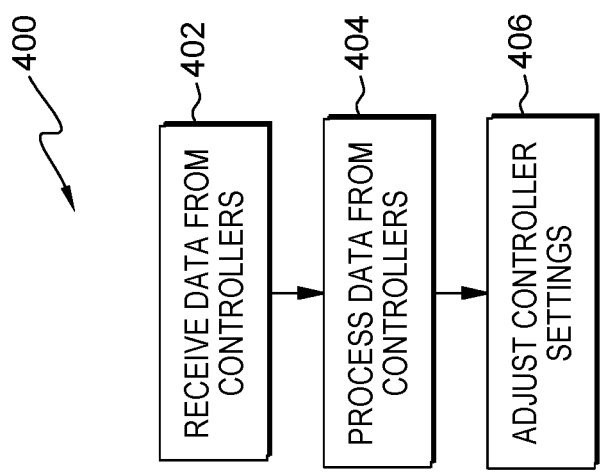
FIG. 4 depicts a flowchart of the operational steps taken by a monitor system within the environment of FIG. 1, in accordance with an embodiment of the present invention.

FIG. 4 depicts a flowchart of the operational steps taken by the monitor system 113 within the environment of FIG. 1, in accordance with an embodiment of the present invention.

In step 402, the monitoring system 113 receives data from controllers. Each controller collects data related to each thermal energy production system, and this data is relayed to the monitoring system 113. This data is the various types of data collected by each controller. In some embodiments, the data is relayed to the monitoring system 113 continuously. In additional embodiments, the data is relayed at predetermined time, or when the controller's system is active.

In step 404, the monitoring system 113 process the data received from the controllers. The data collected is processed to determine various parameters associated with the closed-cycle thermodynamic based engine 102 to assist in the efficient, effective, and safe operation of the closed-cycle thermodynamic based engine 102.

In step 406, the monitoring system 113 adjusts the controller settings. To confirm maximum efficiency and safe operation of the closed-cycle thermodynamic based engine 102, the monitoring system 113 directs the controllers how to properly adjust their individual systems to provide adequate power to the closed-cycle thermodynamic based engine 102. For example, if the solar energy system 107 is unable to purely provide adequate thermal energy for the closed-cycle thermodynamic based engine 102, the monitoring system 113 may direct additional thermal energy from the biomass energy system 101 to meet the desired thermal energy for the closed-cycle thermodynamic based engine 102. In additional embodiment, the monitoring system 113 may provide a message or notification to a person or third party to inform them of the status of the system if manual operations are required or to inform a person or third party.

Figure 5:
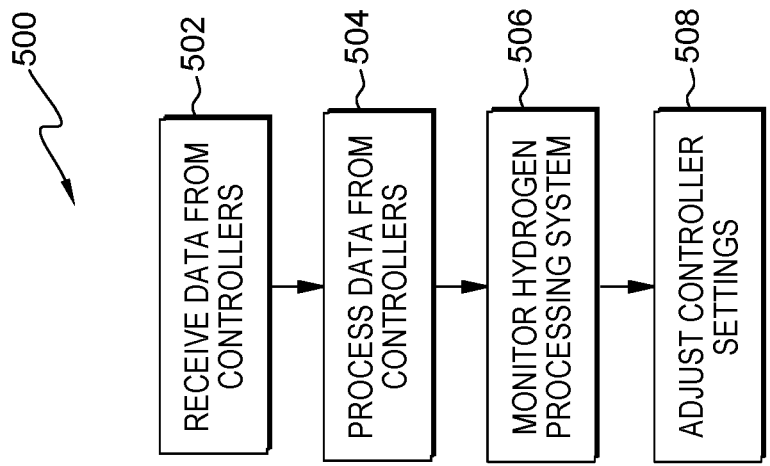
FIG. 5 depicts a flowchart of the operational steps taken by the monitor system within the environment of FIG. 2 or 3, in accordance with an embodiment of the present invention.

FIG. 5 depicts a flowchart of the operational steps taken by the monitor system within the environment of FIG. 2 or 3, in accordance with an embodiment of the present invention.

In step 502, the monitoring system 113 receives data from controllers. Each controller collects data related to each thermal energy production system, and this data is relayed to the monitoring system 113. This data is the various types of data collected by each controller. In some embodiments, the data is relayed to the monitoring system 113 continuously. In additional embodiments, the data is relayed at predetermined time, or when the controller's system is active.

In step 504, the monitoring system 113 process the data received from the controllers. The data collected is processed to determine various parameters associated with the closed-cycle thermodynamic based engine 102 to assist in the efficient, effective, and safe operation of the closed-cycle thermodynamic based engine 102.

In Step 506, the monitoring system 113 monitors the hydrogen processing system. In FIGS. 2 and 3, the electrolysis processing system 116 generates the hydrogen which is stored in the storage container 117. The hydrogen is then supplied to either the combustion chamber 114 or to a fuel cell 123. The monitoring system 113 controls the activation of the hydrogen production process. In some embodiments, where the fuel cell 123 is incorporated into the system 300, the monitoring system 113 controls the electricity generated from the fuel cell 123 as well as the flow of hydrogen into the fuel cell 123 from the storage container 117. In some embodiments, the hydrogen processing system has integrated monitoring systems, sensors, and data collection elements, which relay the information to the monitoring system 113, which then processes the information and relays commands to the necessary components to achieve the desired result.

In step 508, the monitoring system 113 adjusts the controller settings. To confirm maximum efficiency and safe operation of the closed-cycle thermodynamic based engine 102, the monitoring system 113 directs the controllers how to properly adjust their individual systems to provide adequate power to the closed-cycle thermodynamic based engine 102. For example, if the solar energy system 107 is unable to purely provide adequate thermal energy for the closed-cycle thermodynamic based engine 102, the monitoring system 113 may direct additional thermal energy from the biomass energy system 101 to meet the desired thermal energy for the closed-cycle thermodynamic based engine 102. In additional embodiment, the monitoring system 113 may provide a message or notification to a person or third party to inform them of the status of the system if manual operations are required or to inform a person or third party.

In various exemplary embodiments, the system will have the ability to collect heat from any one or more sources, including the combustion of biomass, combustion of fluid hydrocarbons, combustion of hydrogen, and/or the focusing of solar energy. Through any or all of the means of heat transfer, the thermal energy will be applied to the heater head of one or more Stirling engines or various other closed-cycle thermodynamic engine. The engine system will function how its manufacturers intended it, generating electricity as a targeted by-product, with a warm water waste heat as a secondary by product. In an exemplary embodiment, each of the features of the generating system will be controlled by a central computer. Various algorithms based off of inputs from the user, the demand, and various sensors throughout the system and environment; will modulate the metering devices of each of the heat inputs so as to not damage the system or waste energy.

The electricity is to be used by the target load or loads, including but not limited to, homes, businesses, remotely located equipment, or the like. When producing more energy than is consumed by the load, the system is to store the excess energy via any one of several energy storage mediums. In one embodiment, the energy storage medium is electrical storage mediums of batteries through the use of converters, inverters, transformers, controllers, and other components known to those skilled in the arts. In another embodiment, the energy storage medium is chemical storage mediums, such as the storage of hydrogen, via metal hydride storage system, compressed gaseous storage system, liquid hydrogen storage systems, or various chemical storage systems. In some embodiments, the power plant generates its own hydrogen fuel through electrolysis or similar processes. The electrolysis or similar processes may be used to provide hydrogen directly to the closed-cycle thermodynamic based engine, may store the hydrogen for later use, may supply a fuel cell system which is integrated into the power plant for additional electricity generation, or a combination of these. Between the batteries and other combined reactions that have taken place to store the energy, when the system has produced sufficient energy to fill the storage mediums, the system will feed the excess energy back into the grid. By feeding the existing electrical grid, the system can generate income for the end user.

When the load exceeds the on-demand production capacity of the provided heat or the system of Stirling engines, the electrical storage medium will begin to discharge through the conversion equipment as specified, acting as additional capacity for the load. In an exemplary embodiment, algorithms included within the integrated technology of the system will control the functions of the storage systems, including but not limited to charge, discharge, feeding of the grid, system protection, and alternating storage mediums.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A renewable energy utilization engine power plant comprising:
    a solar radiant energy collecting system, wherein the solar radiant heat collecting system comprises:
    a focusing apparatus for collecting solar radiant energy, wherein an adjustment mechanism is integrated with the focusing apparatus, wherein the adjustment mechanism is able to adjust the positioning of the focusing apparatus based on the position of the solar radiant energy source, and
    a light guide for guiding the solar radiant energy collected by the focusing apparatus to a heating chamber, wherein a control mechanism is integrated with the light guide, wherein the control mechanism adjusts the solar radiant energy which is collected in the heating chamber;
    a biomass processing system, wherein the biomass processing system generates thermal energy from the conversion of biomass material;
    a combustible fluid processing system, wherein the combustible fluid processing system generates thermal energy from the combustion of the combustible fluid within a combustion chamber;
    a closed-cycle thermodynamic based engine driven by the collection of the solar radiant energy and thermal energy, wherein the mechanical power generated by the closed-cycle thermodynamic based engine is converted to electrical energy;
    an electrolysis processing system, wherein the electrolysis processing system produces a combustible fluid, which is stored in a storage container; and
    a fuel cell which uses the combustible fluid to generate electricity, wherein the electricity is stored in a battery.

2. The renewable energy utilization engine power plant of claim 1, further comprising a cooling system integrated with the heating chamber of the closed-cycle thermodynamic based engine.

3. The renewable energy utilization engine power plant of claim 1, wherein the combustion chamber and the heating chamber are integrated into the closed-cycle thermodynamic based engine.

4. The renewable energy utilization engine power plant of claim 1, wherein the combustible fluid processing system is in communication with the storage container.

5. The renewable energy utilization engine power plant of claim 4, further comprising an electrochemical cell that converts the combustible fluid into electricity, wherein the electrochemical cell is connected with the storage container.

6. The renewable energy utilization engine power plant of claim 5, further comprising a battery assembly connected to the electrochemical cell and the closed-cycle thermodynamic based engine.

7. The renewable energy utilization engine power plant of claim 1, further comprising a control system, in electrical communication with the solar radiant energy collecting system, the biomass processing system, the combustible fluid processing system, wherein the control system adjusts the quantity of thermal energy generated by each system which are provided to the heating chamber.

8. The renewable energy utilization engine power plant of claim 1, wherein the focusing apparatus is a parabolic mirror.

9. The renewable energy utilization engine power plant of claim 1, wherein the light guide is a plurality of flexible fibers.

10. A method of producing electrical energy, the method comprising:
    collecting solar radiant energy through at least one focusing device and directing the concentrated solar radiant energy to a heating chamber of a closed-cycle thermodynamic based engine;
    generating heat through the conversion of biomass and directing the generated heat to the heating chamber of the closed-cycle thermodynamic based engine;
    producing a combustible fluid through electrolysis;
    monitoring the flow of the combustible fluid, wherein when the quantity of the combustible fluid reaches a predetermined volume, the producing of the combustible fluid is initiated;
    combusting combustible fluids, wherein heat is produced, and directing the heat to the heating chamber of the a closed-cycle thermodynamic based engine; and
    using the solar radiant energy and the heat to generate mechanical energy, wherein a mechanical energy is converted into electrical energy.

11. The method of producing electrical energy, of claim 10, further comprising, monitoring the solar radiant energy, and controlling the quantity of joules provided to the heating chamber.

12. The method of producing electrical energy, of claim 11, further comprising, controlling, the quantity of joules which are transferred to the heating chamber.

13. The method of producing electrical energy, of claim 10, further comprising, adjusting a focusing apparatus based on the position of the source of the solar radiant energy.

14. The method of producing electrical energy, of claim 10, further comprising, monitoring the heat generated by the conversion of the biomass.

15. The method of producing electrical energy, of claim 10, further comprising, performing an electrochemical reaction to the combustible fluid, wherein electricity is produced, and storing the electricity in a battery assembly.

16. The renewable energy utilization engine power plant of claim 1, wherein a converter is connected to the battery to convert alternating current to direct current.

17. The renewable energy utilization engine power plant of claim 1, wherein the combustible fluid processing system further comprises a conversion component to convert the mechanical energy to electrical energy.

18. The renewable energy utilization engine power plant of claim 1, wherein the combustible fluid processing system further comprises a monitoring system.

* * * * *